United States Patent
Chen et al.

(10) Patent No.: US 11,962,673 B2
(45) Date of Patent: Apr. 16, 2024

(54) PACKET TUNNELING AND DECAPSULATION WITH SPLIT-HORIZON ATTRIBUTES

(71) Applicant: ZTE Corporation, Shenzhen (CN)

(72) Inventors: Ran Chen, Shenzhen (CN); Yubao Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 392 days.

(21) Appl. No.: 17/423,697

(22) PCT Filed: Jan. 16, 2020

(86) PCT No.: PCT/CN2020/072458
§ 371 (c)(1),
(2) Date: Jul. 16, 2021

(87) PCT Pub. No.: WO2020/147784
PCT Pub. Date: Jul. 23, 2020

(65) Prior Publication Data
US 2022/0094769 A1  Mar. 24, 2022

(30) Foreign Application Priority Data

Jan. 16, 2019  (CN) .......................... 201910040672.8

(51) Int. Cl.
*H04L 69/22*  (2022.01)
*H04L 12/46*  (2006.01)

(52) U.S. Cl.
CPC .......... *H04L 69/22* (2013.01); *H04L 12/4633* (2013.01); *H04L 12/4641* (2013.01)

(58) Field of Classification Search
CPC . H04L 69/22; H04L 12/4633; H04L 12/4641; H04L 12/1877; H04L 12/1886;
(Continued)

(56) References Cited

U.S. PATENT DOCUMENTS

| 8,953,590 B1 | 2/2015 | Aggarwal et al. |
| 2011/0164617 A1 | 7/2011 | Yong |

(Continued)

FOREIGN PATENT DOCUMENTS

| CN | 105099846 A | 11/2015 |
| CN | 107241269 A | 10/2017 |

(Continued)

OTHER PUBLICATIONS

International Search Report for corresponding application PCT/CN2020/072458 filed Jan. 16, 2020; dated Mar. 27, 2020.
(Continued)

*Primary Examiner* — Rushil P. Sampat
(74) *Attorney, Agent, or Firm* — CANTOR COLBURN LLP

(57) ABSTRACT

Provided is a message decapsulation method and device, a message encapsulation method and device, an electronic device, and a storage medium. The message decapsulation method includes: a data packet sent by a first node is decapsulated, and the data packet is obtained by encapsulating, by the first node, a data message sent through a first Attachment Circuit (AC). The data packet carries split horizon attributes of the first AC determined by the first node. The split horizon attributes of the first AC include at least one of the following: a leaf attribute, a root attribute, and an Ethernet Segment Identifier (ESI) attribute.

19 Claims, 5 Drawing Sheets

(58) Field of Classification Search
CPC .............. H04L 12/4645; H04L 12/465; H04L 12/4675; H04L 45/18; H04L 47/31; H04L 45/245
See application file for complete search history.

(56) References Cited

U.S. PATENT DOCUMENTS

| | | |
|---|---|---|
| 2012/0300784 A1 | 11/2012 | Jiang |
| 2014/0204942 A1 | 7/2014 | Kermarec |
| 2017/0230197 A1* | 8/2017 | Zhang .................... H04L 45/64 |
| 2017/0324849 A1* | 11/2017 | Pfister .................. H04L 69/324 |
| 2019/0222431 A1* | 7/2019 | Gao ........................ H04L 45/18 |
| 2019/0238364 A1* | 8/2019 | Boutros ................ H04L 45/745 |

FOREIGN PATENT DOCUMENTS

| | | |
|---|---|---|
| CN | 108259291 A | 7/2018 |
| CN | 108600109 A | 9/2018 |
| WO | WO 2018/120798 A1 * | 7/2018 |

OTHER PUBLICATIONS

European Search Report for corresponding application EP20741179; Report dated Feb. 2, 2022.

* cited by examiner

A data packet sent by a first node is decapsulated, the data packet being obtained by encapsulating, by the first node, a data message sent through a first AC, the data packet carrying split horizon attributes of the first AC determined by the first node, and the split horizon attributes of the first AC includes at least one of the following: a leaf attribute, a root attribute, an ESI attribute — S102

Fig.1

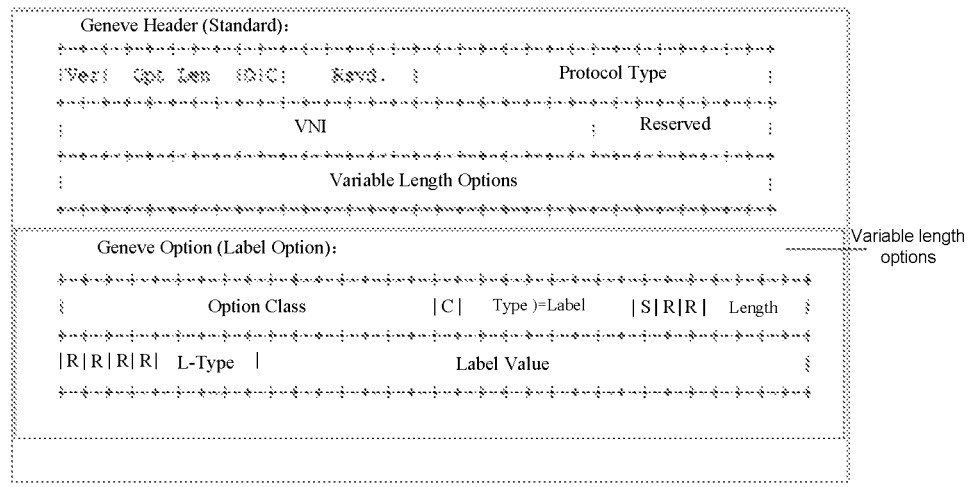

PACKET TUNNELING AND DECAPSULATION WITH SPLIT-HORIZON ATTRIBUTES

CROSS-REFERENCE TO RELATED APPLICATION

The present disclosure claims priority to Chinese Patent Application No. 201910040672.8, filed to the China National Intellectual Property Administration on Jan. 16, 2019, the disclosure of which is hereby incorporated by reference in its entirety.

TECHNICAL FIELD

The present disclosure relates to the field of communications, for example, to a message decapsulation method and device, a message encapsulation method and device, an electronic device, and a storage medium.

BACKGROUND

The Metro Ethernet Forum (MEF) defines an Ethernet Tree (E-Tree) service, that is, a rooted multipoint service. E-Tree is characterized by one or more Root Attachment Circuits (ACs) and at least two Leaf ACs. In the E-Tree service, the corresponding user-side interface between two root attributes and the corresponding user-side interfaces between a root attribute and a leaf attribute can communicate with each other, but the corresponding user-side interfaces between two leaf attributes cannot communicate with each other. At present, a data encapsulation standard in the Network Virtualization Over Layer 3 (NVO3) technology is Generic Network Virtualization Encapsulation (Geneve), while the nature of information developed in the NVO3 technology is Virtual Extensible Local Area Network Generic Protocol Extension (VXLAN-GPE).

NVO3 is a technology for realizing network virtualization, through which a physical network can be virtualized, so that the same physical network can be used by different tenants, and the traffic between tenants can be isolated. A NVO3 encapsulation header contains 24 bits of Virtual Network Identifier (VNI). Different VNIs are used to identify different virtual networks. At present, the NVO3 technology cannot realize the simulation of the above E-Tree service.

At present, in a related art, there is no effective solution for the problem that the NVO3 technology cannot realize the simulation of the E-Tree service.

SUMMARY

Embodiments of the present disclosure provide a message decapsulation method and device, a message encapsulation method and device, an electronic device, and a storage medium to at least solve the problem in the related art that the NVO3 technology cannot realize the simulation of the E-Tree service.

According to an embodiment of the present disclosure, a message decapsulation method is provided, which is applied to a second node and may include the following step: a data packet sent by a first node is decapsulated, wherein the data packet is obtained by encapsulating, by the first node, a data message sent through a first AC, the data packet carries split horizon attributes of the first AC determined by the first node, the split horizon attributes of the first AC include at least one of a leaf attribute, a root attribute, or an Ethernet Segment Identifier (ESI) attribute.

According to another embodiment of the present disclosure, a message encapsulation method is also provided, which is applied to the first node and may include the following steps: the split horizon attributes of the first AC are determined; and the split horizon attributes of the first AC include at least one of the leaf attribute, the root attribute, or the ESI attribute; the data message sent through the first AC is encapsulated to obtain a data packet, and the data packet is sent to the second node. The data packet carries the split horizon attributes of the first AC.

According to another embodiment of the present disclosure, a message decapsulation device is also provided, which is applied to the second node, and may include a decapsulating module, and the decapsulating module is configured to decapsulate the data packet sent by the first node, wherein the data packet is obtained by encapsulating, by the first node, the data message sent through the first AC, and the data packet carries the split horizon attributes of the first AC determined by the first node, the split horizon attributes of the first AC include at least one of the leaf attribute, the root attribute, or the ESI attribute.

According to another embodiment of the present disclosure, a message encapsulation device is also provided, which is applied to the first node, and may include: a determining module and an encapsulating module. The determining module is configured to determine the split horizon attributes of the first AC. The split horizon attributes of the first AC include at least one of the leaf attribute, the root attribute, or the ESI attribute. The encapsulating module is configured to encapsulate the data message sent through the first AC to obtain the data packet, and send the data packet to the second node. The data packet carries the split horizon attributes of the first AC.

According to yet another embodiment of the present disclosure, a storage medium is also provided. The storage medium stores a computer program. The computer program is configured to execute, when running, steps in any of the above method embodiments.

According to yet another embodiment of the present disclosure, an electronic device is also provided, which includes a memory and a processor. The memory stores a computer program. The processor is configured to run the computer program to execute steps in any of the above method embodiments.

Through the present disclosure, in the process of decapsulating the data packet sent by the first node, the data packet, which is obtained by encapsulating, by the first node, the data message sent through the first AC, carries the split horizon attributes of the first AC determined by the first node, and the split horizon attributes of the first AC include at least one of the leaf attribute, the root attribute, or the ESI attribute. Therefore, the present disclosure may solve the problem in the related art that the NVO3 technology cannot realize the simulation of the E-Tree service, so as to achieve the effect of realizing the simulation of the E-Tree service in the NVO3 technology.

BRIEF DESCRIPTION OF THE DRAWINGS

FIG. 1 is a flowchart of a message decapsulation method provided according to an embodiment of the present disclosure.

FIG. 2 is a first schematic diagram of a Geneve Header in a data packet encapsulation format provided according to an embodiment of the present disclosure.

DETAILED DESCRIPTION OF THE EMBODIMENTS

Figure 3:
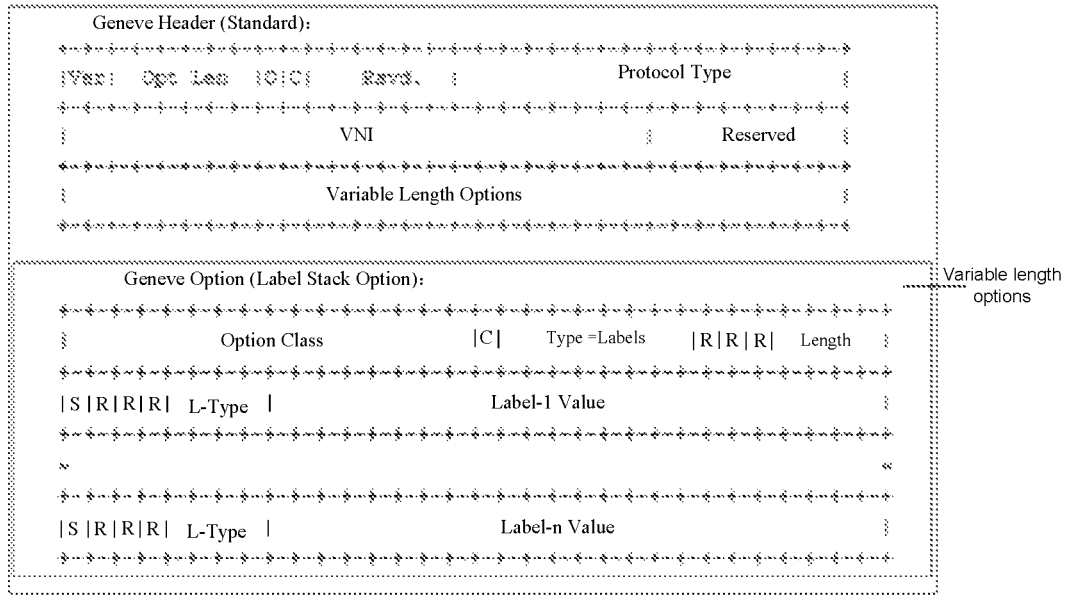
FIG. 3 is a second schematic diagram of a Geneve Header in a data packet encapsulation format provided according to an embodiment of the present disclosure.

The present disclosure is elaborated below with reference to the accompanying drawings and embodiments. It is to be noted that the embodiments in the disclosure and characteristics in the embodiments may be combined without conflicts.

It should be noted that the specification and claims of the disclosure and terms "first", "second", etc. in the foregoing drawings are used for distinguishing similar objects rather than describing a specific sequence or a precedence order.

Embodiment One

In the present embodiment, a message decapsulation method is provided, which is applied to a second node. FIG. 1 is a flowchart of the message decapsulation method provided according to an embodiment of the present disclosure. As shown in FIG. 1, the method includes the following steps.

At S102, a data packet sent by a first node is decapsulated. The data packet is obtained by encapsulating, by the first node, a data message sent through a first AC. The data packet carries split horizon attributes of the first AC determined by the first node. The split horizon attributes of the first AC include at least one of a leaf attribute, a root attribute, or an ESI attribute.

Through the method in the present embodiment, in the process of decapsulating the data packet sent by the first node, the data packet, which is obtained by encapsulating, by the first node, the data message sent through the first AC, carries the split horizon attributes of the first AC determined by the first node, and the split horizon attributes of the first AC include at least one of the leaf attribute, the root attribute, or the ESI attribute. Therefore, the method in the present embodiment may solve the problem in the related art that the NVO3 technology cannot realize the simulation of the E-Tree service, so as to realize the simulation of the E-Tree service in the NVO3 technology.

It is to be noted that the execution body of S102 is the second node.

It is to be noted that both the first node and the second node in S102 may be device nodes in an NVO3 application scenario. Generally speaking, the device nodes in the NVO3 may adopt Network Virtualization Edge (NVE) devices, which are used for a user's virtual machine to access a network through a physical or logical connection. Correspondingly, the first AC is the first AC formed between the user and the NVE device that constitutes the first node. The user transmits the data message to the first node through the first AC. The first node encapsulates the data message to obtain the data packet that may be sent to the second node. After receiving the data packet, the NVE device constituting the second node may perform decapsulation in S102.

At the same time, the split horizon attributes of the first AC may include either the ESI attribute or any one of the root attribute and the leaf attribute. For example, the split horizon attributes of the first AC include the leaf attribute; or the split horizon attributes of the first AC include the root attribute; or, the split horizon attributes of the first AC include the leaf attribute and the ESI attribute; or, the split horizon attributes of the first AC include the root attribute and the ESI attribute.

That the split horizon attributes of the first AC include the ESI attribute is used to indicate that the first AC belongs to a certain ESI, that is, when the first AC belongs to a certain ESI, the split horizon attributes of the first AC include the ESI attribute. Conversely, if the first AC does not belong to any ESI, the split horizon attributes of the first AC do not include the ESI attribute. That the split horizon attributes of the first AC include any one of the root attribute and the leaf attribute is used to indicate a node attribute of a user-side interface corresponding to the first AC in the E-Tree service.

At the same time, in S102, for the split horizon attributes of the first AC determined by the first node, the first node may determine the split horizon attributes of the first AC before receiving the data message sent by the first AC, or the first AC actively carries relevant information used for indicating the split horizon attributes of the first AC in the process of sending the data message to the first node, which is not limited by the present disclosure.

It is to be noted that the first node and the second node are only used to indicate a data message sender and a data message receiver in the process of performing the simulation of the E-Tree service in the NVO3 technology. Correspondingly, the first AC and the second AC in an optional embodiment also represent only the ACs connected to the first node and the second node. The order of the first node and the second node, and the order of the first AC and the second AC are not limited by the present disclosure.

In an optional embodiment, the formats of the data packet include one of the following: Geneve and VXLAN-GPE.

It is to be noted that because Geneve is a data encapsulation standard developed in the NVO3 technology, and VXLAN-GPE is the nature of information developed in the NVO3 technology, using one of the above two formats to encapsulate the data packet may realize the simulation of the E-Tree service in the NVO3 technology.

In an optional embodiment, in S102, when the format of the data packet is Geneve, the data packet includes a Geneve Header, which is used to carry the split horizon attributes of the first AC.

In an optional embodiment, the Geneve Header includes variable length options, Geneve option data types are extended in the variable length options, and the Geneve option data types are used to carry the split horizon attributes of the first AC.

FIG. 2 is a first schematic diagram of a Geneve Header in a data packet encapsulation format provided according to an embodiment of the present disclosure. As shown in FIG. 2, on the premise of using the Geneve format as the data packet encapsulation format, the data packet includes the Geneve Header, and the Geneve Header includes the variable length options, that is, a Variable Length Options field shown in FIG. 2.

To illustrate the extended content of the variable length options in the optional embodiment, Geneve option data types extended in a variable length option area, that is, the Geneve Option shown in FIG. 2, are listed in the corresponding variable length option area shown in FIG. 2. In the optional embodiment, the Geneve Option may also be denoted as a Label option, that is, the Label Option shown in FIG. 2. In the optional embodiment, the Label Option is used to indicate the split horizon attributes of the first AC, so as to carry the split horizon attributes of the first AC in the Geneve option data type.

The Label Option may indicate the split horizon attributes of the first AC in such a way that the split horizon attributes of the first AC include at least the leaf attribute by carrying the Label Option, that is, when the variable length option of the Geneve Header in the data packet is extended with the Label Option, the data packet may indicate that the split horizon attributes of the first AC include at least the leaf attribute and do not include the root attribute; and when the variable length option of the Geneve Header in the data packet is not extended with the Label Option, the data packet may indicate that the split horizon attributes of the first AC include at least the root attribute and do not include the leaf attribute. In S102, the second node may determine the split horizon attributes of the first AC carried in the data packet by determining in a decapsulation process whether the data packet is extended with the Label Option.

There may be many extension formats of the Label Option in the variable length options in the data packet. FIG. 2 shows an extension format of the Label Option. As shown in FIG. 2, the Label Option carries a label, which is called a Label Value in the optional embodiment. A label encapsulation type used by the Label Value is indicated by the corresponding Label type (L-type) carried in the Label Option. The label encapsulation type of the Label Value may be either a forwarding label or an implicit null label. For example, when the Label Value is actually encapsulated using the forwarding label, the L-type indicates that the label encapsulation format of the Label Value is the forwarding label. It is to be noted that whether the Label Value is the forwarding label or the implicit null label, it may indicate that the split horizon attributes of the first AC include the leaf attribute.

At the same time, when the Label Value is the forwarding label, the Label Value may adopt either a Multi-Protocol Label Switching (MPLS) label or a Virtual Network Identifier (VNI) label. When the Label Value is the implicit null label, the implicit null label is a form of the Label Value. In this case, a message length of the Label Value is 0, that is, a byte length of Length in the Label Option shown in FIG. 2 is 0. However, in this case, the Label Option is still extended in the variable length options of the Geneve Header, at this point, the Label Value can serve as the implicit null label to indicate that the split horizon attributes of the first AC include the leaf attribute.

It is to be noted that in the optional embodiment, extension modes of the Label Option in the variable length options in the data packet include, but not limited to, the mode shown in FIG. 2. The present disclosure does not limit the extension format of the Label Option in the Geneve Header.

FIG. 3 is a second schematic diagram of a Geneve Header in a data packet encapsulation format provided according to an embodiment of the present disclosure. As shown in FIG. 3, on the premise of using the Geneve format as the data packet encapsulation format, the data packet includes the Geneve Header, and the Geneve Header includes the variable length options, that is, the Variable Length Options field shown in FIG. 3.

To illustrate the extended content of the variable length options in the optional embodiment, the Geneve option data types extended in the variable length option area, that is, the Geneve Option shown in FIG. 3, are listed in the variable length option area shown in FIG. 3. In the optional embodiment, the Geneve Option may also be denoted as the Label option, that is, a Label Stack Option shown in FIG. 3. By indicating the split horizon attributes of the first AC through the Label Stack Option, in the optional embodiment, the split horizon attributes of the first AC are carried in the Geneve option data type.

The Label Stack Option may indicate the split horizon attributes of the first AC in such a way that the split horizon attributes of the first AC include at least the leaf attribute by carrying the Label Stack Option, that is, when the variable length option of the Geneve Header in the data packet is extended with the Label Stack Option, the data packet may indicate that the split horizon attributes of the first AC include at least the leaf attribute and do not include the root attribute; and when the variable length option of the Geneve Header in the data packet is not extended with the Label Stack Option, the data packet may indicate that the split horizon attributes of the first AC include at least the root attribute and do not include the leaf attribute. In S102, the second node may determine the split horizon attributes of the first AC carried in the data packet by determining in the decapsulation process whether the data packet is extended with the Label Stack Option.

There may be many extension formats of the Label Stack Option in the variable length options in the data packet. FIG. 3 shows an extension format of the Label Stack Option. Different from the Label Option in FIG. 2 which carries a single Label Value, as shown in FIG. 3, the Label Stack Option carries 1 to n Label Values, that is, Label-1 Value to Label-n Value in FIG. 3. Each Label Value has an L-type used for indicating the label encapsulation type of the Label Value. The label encapsulation type corresponding to any Label Value in the Label-1 Value to the Label-n Value is the same as that of the Label Value shown in FIG. 2, so it will not be repeated here.

It is to be noted that the Label Values from the Label-1 Value to the Label-n Value together constitute a label stack. In the label stack, there is at least one Label Value existing to indicate that the split horizon attributes of the first AC include at least the leaf attribute, so that the Label Stack Option may indicate that the split horizon attributes of the first AC include at least the leaf attribute, and then the Geneve option data type may carry the split horizon attributes of the first AC. Besides, the remaining Label Values may also be used to indicate whether the split horizon attributes of the first AC include other attributes, for example, the ESI attribute.

Figure 4:
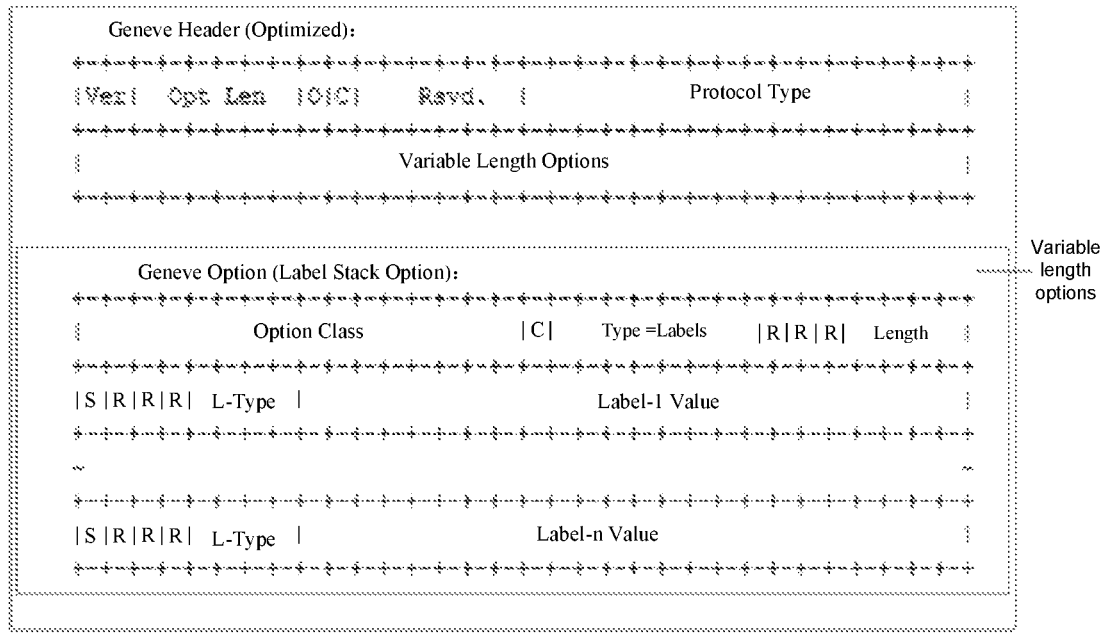
FIG. 4 is a third schematic diagram of a Geneve Header in a data packet encapsulation format provided according to an embodiment of the present disclosure.

FIG. 4 is a third schematic diagram of a Geneve Header in a data packet encapsulation format provided according to an embodiment of the present disclosure. As shown in FIG. 4, FIG. 4 uses a similar encapsulation and extension mode to the Geneve Header shown in FIG. 3, that is, the Geneve option data type, namely the Geneve Option shown in FIG. 4, is extended in the variable length option area of the Geneve Header. In the optional embodiment, the Geneve Option may also be denoted as the Label option, that is, the Label Stack Option shown in FIG. 4. By indicating the split horizon attributes of the first AC through the Label Stack Option, in the optional embodiment, the split horizon attributes of the first AC are carried in the Geneve option data type. Besides, the format in the Label Stack Option shown in FIG. 4 is the same as that in FIG. 3, so it will not be repeated here.

Different from the Geneve Header shown in FIG. 3, the Geneve Header shown in FIG. 4 deletes the VNI field in it, and moves the VNI field into the Label Stack Option for definition. In an embodiment, the VNI field may be moved into the Label Stack Option to indicate the meaning of the VNI field through any Label Value in the Label-1 Value to the Label-n Value in the Label Stack Option. In the optional embodiment, optionally, the meaning of the VNI field is indicated with the first Label Value in the Label-1 Value to the Label-n Value, that is, the Label-1 Value. It is to be noted that on the premise of indicating the meaning of the VNI field with the Label-1 Value, there is still at least one Label Value in the Label-2 Value to the Label-n Value for indicating that the split horizon attributes of the first AC include at least the leaf attribute.

It is to be noted that indicating the meaning of the VNI field through the Label-1 Value may be that the identity of the corresponding user who sends the data message through the first AC is indicated through the Label-1 Value.

Besides, when the format of the Label Option is extended in a data message encapsulation process, the encapsulated data packet may carry multiple Label Options to form the label stack. It is to be noted that whether the Label option in the label stack is the MPLS label or the VNI label is indicated by the corresponding L-type. For each Label option, a single S flag bit is set for the VNI label or the MPLS label in the Label option, and the S flag bit is used to indicate that the label is at the bottom of stack of the Label option.

In an optional embodiment, a Protocol Type field is extended in the Geneve Header, and the value of the Protocol Type field is a first E-Tree specified value. That the value of the Protocol Type field is the first E-Tree specified value is used to indicate that: the inner load of the data packet includes the data message, and the split horizon attribute of the first AC used for sending the data message is the leaf attribute.

It is to be noted that, a different mode of extending the Geneve Header from that in FIG. 2 to FIG. 4 is used in the optional embodiment, that is, the Protocol Type field is extended in the Geneve Header, and the split horizon attributes of the first AC are carried in the Geneve Header by assigning a value to the Protocol Type field.

Figure 5:
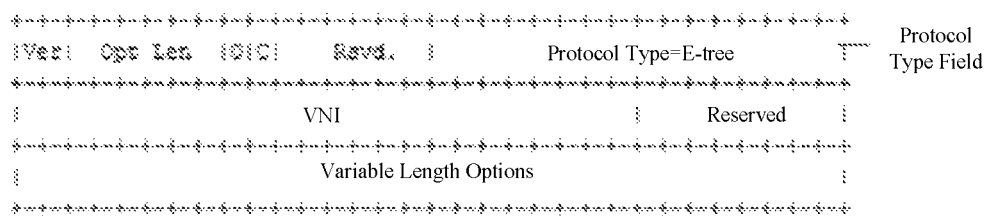
FIG. 5 is a fourth schematic diagram of a Geneve Header in a data packet encapsulation format provided according to an embodiment of the present disclosure.

FIG. 5 is a fourth schematic diagram of a Geneve Header in a data packet encapsulation format provided according to an embodiment of the present disclosure. As shown in FIG. 5, on the premise of using the Geneve format as the data packet encapsulation format, the data packet includes the Geneve Header, and the Geneve Header includes the Protocol Type field, that is, the Protocol Type field shown in FIG. 5.

It is to be noted that the Protocol Type field in the Geneve Header is used to indicate the type of the protocol used by the data message encapsulated in the Geneve. The Protocol Type field may be set by assigning different values to it, such as 0X6558, so as to realize the application of the Geneve Header in different scenarios. In the optional embodiment, the Protocol Type is assigned with the first E-Tree specified value. The first E-Tree specified value is a preset value according to simulation requirements of the E-Tree service. Here, assigning the Protocol Type with the first E-Tree specified value has the following meanings.

1) The type of the protocol used by Geneve is the protocol conforming to E-Tree; under the protocol, the data packet encapsulated by Geneve may indicate that the inner load of the data packet includes the data message (the data message sent by the first AC).

2) The split horizon attribute of the first AC sending the data message is the leaf attribute, that is, the split horizon attribute of the first AC is indicated as the leaf attribute through the first E-Tree specified value.

In the optional embodiment, the split horizon attribute of the first AC may be indicated by assigning the first E-Tree specified value to the Protocol Type, so as to carry the split horizon attribute of the first AC in the Geneve Header. In an embodiment, when the value of the Protocol Type field is the first E-Tree specified value, the split horizon attributes of the first AC include at least the leaf attribute and do not include the root attribute; and when the value of the Protocol Type field does not meet the first E-Tree specified value or is some other value, the split horizon attributes of the first AC include at least the root attribute and do not include the leaf attribute.

It is to be noted that assigning the first E-Tree specified value to the Protocol Type may include other meanings, which is not limited by the present disclosure, that is, any inner load that may at least represent the data packet includes the data message, and all values indicating that the split horizon attribute of the first AC sending the data message is the leaf attribute may serve as the first E-Tree specified value.

There are multiple schemes for that the first E-Tree specified value indicates that the split horizon attribute of the first AC sending the data message is the leaf attribute, which is not limited by the present disclosure. In an embodiment, the above scheme may be that: when the data message sent by the first AC is encapsulated, the same format as an inner Ethernet message of the E-Tree data message defined in the Request For Comments 7796 (RFC7796) is used for the Ethernet message of the inner load of the data packet, and Leaf VLAN is carried in the Ethernet message of the inner load of the data packet to indicate that the split horizon attribute of the first AC sending the data message is the Leaf attribute. In this way, it may be indicated that the inner load of the data packet includes the data message by setting the format of the Ethernet message of the inner load in the data packet, and it may be indicated that the split horizon attribute of the first AC is the leaf attribute by carrying the Leaf VLAN in the Ethernet message.

In an optional embodiment, in S102, when the format of the data packet is VXLAN-GPE, the data packet includes a VXLAN-GPE Header, which is used to carry the split horizon attribute of the first AC.

In an optional embodiment, a Next Protocol (NP) field is extended in the VXLAN-GPE Header, and the value of the NP field is a second E-Tree specified value.

Figure 6:
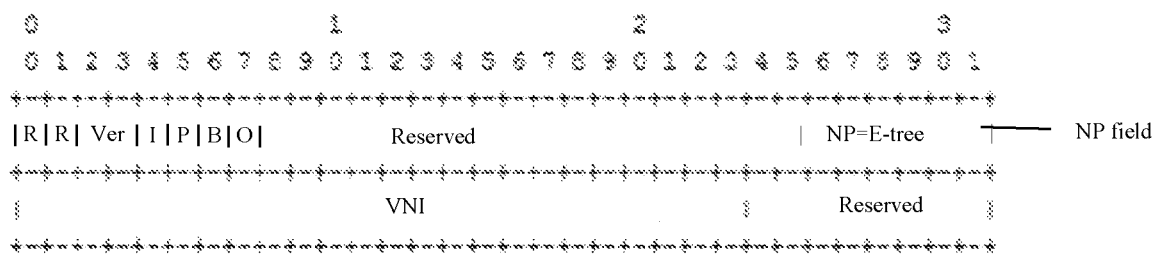
FIG. 6 is a schematic diagram of a VXLAN-GPE Header in a data packet encapsulation format provided according to an embodiment of the present disclosure.

FIG. 6 is a schematic diagram of a VXLAN-GPE Header in a data packet encapsulation format provided according to an embodiment of the present disclosure. As shown in FIG. 6, on the premise of using the VXLAN-GPE format as the data packet encapsulation format, the data packet includes the VXLAN-GPE Header, and the VXLAN-GPE Header includes the NP field, that is, the NP field shown in FIG. 6.

It is to be noted that, the NP field may be the NP field defined in draft-ietf-nvo3-vxlan-gpe, that is, a VXLAN-GPE standard for the nature of information in NVO3 drafted by the Internet Engineering Task Force (IETF). The NP field is used to indicate the next protocol in the VXLAN-GPE Header, that is, the protocol type of the encapsulated data message in the VXLAN-GPE (the data message sent by the first AC). In an embodiment, the indication of the protocol type of the data message may be realized by assigning a value to the NP field. For example, if the data message uses the IPv4 protocol, the NP field may be set to 0x800 for indication.

The value of the NP field is the second E-Tree specified value, that is, by assigning the second E-Tree specified value to the NP field, it is indicated that the inner load of the data packet includes the data message, and the split horizon attribute of the first AC used for sending the data message is the leaf attribute. The second E-Tree specified value is defined according to the above settings, that is, the second E-Tree specified value may at least be used to indicate that the meanings of the NP field include that: the inner load of the data packet includes the data message, and the split horizon attribute of the first AC used for sending the data message is the leaf attribute.

Because the value of the NP field may indicate that the split horizon attribute of the first AC is the leaf attribute by setting it to the second E-Tree specified value, the split horizon attribute of the first AC may be carried through the VXLAN-GPE Header in the optional embodiment; that is, when the value of the NP field is the second E-Tree specified value, the split horizon attributes of the first AC include at least the leaf attribute, and do not include the root attribute; and when the value of the NP field does not meet the second E-Tree specified value or is some other value, the split horizon attributes of the first AC include at least the root attribute, and do not include the leaf attribute.

It is to be noted that assigning the second E-Tree specified value to the NP field may include other meanings, which is not limited by the present disclosure, that is, any inner load that may at least represent the data packet includes the data message, and all values indicating that the split horizon attribute of the first AC used for sending the data message is the leaf attribute may serve as the second E-Tree specified value.

It is to be noted that both the first E-Tree specified value and the second E-Tree specified value are artificially set or defined, and there is no sequential relationship between the first E-Tree specified value and the second E-Tree specified value. Besides, in the optional embodiment, the corresponding value may also be preset for the Protocol Type field or the NP field to indicate that the split horizon attribute of the first AC is the root attribute.

In an optional embodiment, when the split horizon attributes of the first AC include the ESI attribute and the root attribute, the Geneve option data type is also used to carry ESI label information. The ESI label information is used to identify the ESI to which the first AC belongs.

The ESI label information includes one of the following: the MPLS label and the VNI label.

It is to be noted that, that the split horizon attributes of the first AC are the ESI attribute and the root attribute is used to indicate that the split horizon attribute of the first AC is correspondingly the root attribute in the E-Tree service, and the first AC belongs to a certain ESI (that is, the ESI to which the first AC belongs in the optional embodiment). In this case, the split horizon attributes of the first AC have the ESI attribute, at the same time, the split horizon attributes of the first AC may also be the leaf attribute or the root attribute (in the optional embodiment, the split horizon attribute of the first AC is the root attribute). The ESI label information for identifying the ESI to which the first AC belongs may be the MPLS label or the VNI label.

In an optional embodiment, after the data packet sent by the first node is decapsulated, the decapsulated data message is obtained processed according to the following objects: the split horizon attributes of the first AC and the split horizon attributes of the second AC.

It is to be noted that according to rules of the E-Tree service, the root attribute and an access link corresponding to the root attribute may communicate with each other, and the leaf attribute and the access link corresponding to the root attribute may communicate with each other, but the leaf attribute and the access link corresponding to the leaf attribute cannot communicate with each other. Based on this, the second node may determine actions needing to be performed on the data packet according to the comparison between the split horizon attributes of the first AC carried in the data packet and the split horizon attributes of the second AC connected to the second node itself. The actions may include forwarding to the second AC and indicating of discard processing. The process of performing the actions is as follows.

When the split horizon attribute of the second AC connected to the second node is the root attribute, no matter the split horizon attribute of the first AC is the root attribute or the leaf attribute, the second node may forward the decapsulated data message. When the split horizon attribute of the second AC is the leaf attribute, the second node needs to forward the decapsulated data message to the second AC only if the split horizon attribute of the first AC is the root attribute; and if the split horizon attribute of the first AC is the leaf attribute, the second node needs to discard the data packet.

To illustrate the encapsulation of data in the message decapsulation method in the present embodiment, the encapsulation of data in the process of message decapsulation in the present embodiment is described below through specific embodiments.

Specific Example 1

Figure 7:
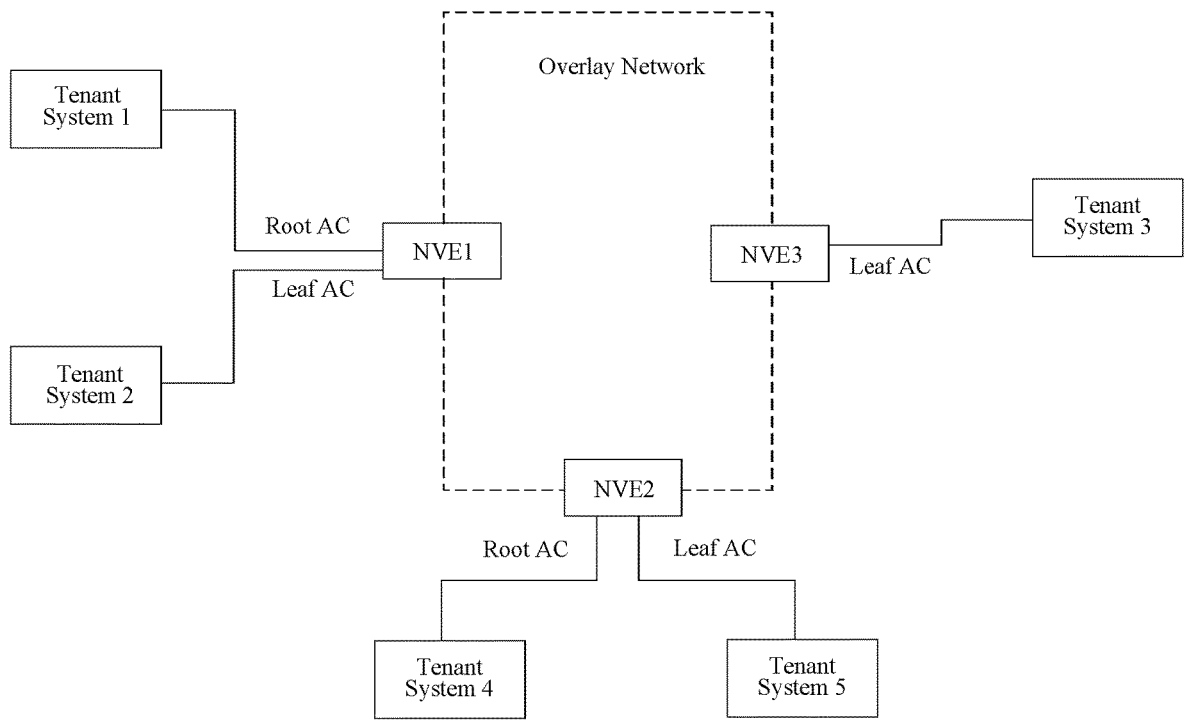
FIG. 7 is a first schematic diagram of a deployment scenario of an E-Tree service provided according to an embodiment of the present disclosure.

FIG. 7 is a first schematic diagram of a deployment scenario of an E-Tree service provided according to an embodiment of the present disclosure. In the deployment scenario of the E-Tree service shown in FIG. 7, there are NVE1 node, NVE2 node and NVE3 node. The NVE1 node is connected to a first tenant (Tenant System1) and a second tenant (Tenant System2), and the split horizon attribute of the access link between the NVE1 node and the Tenant System1 is the root attribute, and the split horizon attribute of the access link between the NVE1 node and the Tenant System2 is the leaf attribute. The NVE2 node is connected to a fourth tenant (Tenant System4) and a fifth tenant (Tenant System5), and the split horizon attribute of the access link between the NVE2 node and the Tenant System4 is the root attribute, and the split horizon attribute of the access link between the NVE2 node and the Tenant System5 is the leaf attribute. The NVE3 node is connected to a third tenant (Tenant System3), and the split horizon attribute of the access link between the NVE3 node and the Tenant System3 is the leaf attribute.

The NVE1 node receives the data message sent by the tenant. Taking the Tenant System2 as an example, the NVE1 node receives the data message sent by the Tenant System2 and encapsulates it as a Geneve data packet that supports the E-Tree service. Because the access link corresponding to the Tenant System2 is the leaf attribute, the Label Option or the Label Stack Option is extended in the Geneve Header of the Geneve data packet to indicate that the split horizon attribute of the corresponding access link is the leaf attribute. It is to be noted that the Geneve data packet may be encapsulated in any of the encapsulation formats shown in FIG. 2 to FIG. 5 in the present disclosure. The NVE1 node sends the encapsulated data packet to the NVE3 node after encapsulation.

After receiving the data packet, the NVE3 node performs decapsulation and obtains in the decapsulation process that the split horizon attribute of the access link corresponding to the data packet is the leaf attribute. Because the access link of the Tenant System3 corresponding to the NVE3 node is also the leaf property, in this case, the NVE3 node needs to discard the data packet instead of forwarding the data packet to the Tenant System3.

When the access link corresponding to the data packet sent by the NVE1 node or the NVE2 node to the NVE3 node is the root attribute, the NVE3 node may perform the forwarding operation after receiving the data packet. The process is similar to the encapsulation and decapsulation of the data message, so it will not be repeated here.

Specific Example 2

Figure 8:
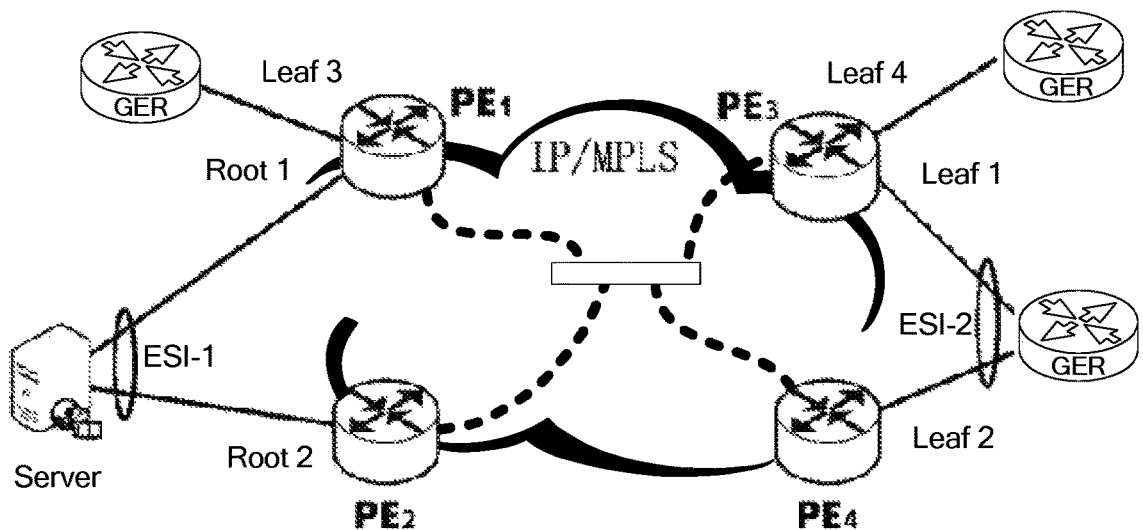
FIG. 8 is a second schematic diagram of a deployment scenario of an E-Tree service provided according to an embodiment of the present disclosure.

FIG. 8 is a second schematic diagram of a deployment scenario of an E-Tree service provided according to an embodiment of the present disclosure. In the deployment scenario of the E-Tree service shown in FIG. 8, there are Provider Edges (PE) that constitute NVO3 network nodes, including PE1, PE2, PE3 and PE4. The PE1 is connected to a second user site Site2, which realizes network access by a router GER, and the split horizon attribute of the access link Leaf3 between the PE1 and the Site2 is the leaf attribute. At the same time, the PE1 and the PE2 are also jointly connected to a Server, and the split horizon attributes of access link Root1 and Root2 formed between the PE1 and the PE2 and the Server are the root attribute. The PE3 is connected to a third user site Site3, which realizes the network access by the router GER, and the split horizon attribute of the access link Leaf4 between the PE3 and the Site3 is the leaf attribute. Besides, the PE3 and the PE4 are jointly connected to a first user site Site1, which realizes the network access by the router GER, the split horizon attribute of the access link Leaf1 between the PE3 and the Site1 is the leaf attribute, and the split horizon attribute of the access link Leaf2 between the PE4 and the Site1 is the leaf attribute.

It is to be noted that because the Server is connected to both the PE1 and the PE2 through multiple links, the link between the Server and the PE1 and the link between the Server and the PE2 constitute an Ethernet Segment (ES). In the present embodiment, the ES is identified by ESI-1, that is, the Root1 and the Root2 belong to the ESI-1. Similarly, because the Site1 is connected to both the PE3 and the PE4 through multiple links, the link between the Site1 and the PE3 and the link between the Site1 and the PE4 constitute an ES. In the present embodiment, the ES is identified by ESI-2, that is, the Leaf1 and the Leaf2 belong to the ESI-2.

In the present specific embodiment, the simulation of the E-Tree service is realized among the PE1, the PE2, the PE3 and the PE4 through the Internet Protocol (IP) or MPLS network.

In the deployment scenario of the E-Tree service in the present specific embodiment, taking the forwarding of Broadcast, Unknown Unicast, Multicast (BUM) packets received from the Leaf3, the Root1 and the Leaf1 for example, the specific implementation scheme of the E-Tree service in NVO3 encapsulation is illustrated.

When receiving the BUM packet (the BUM packet is sent by the corresponding user site to the Leaf3) sent by the Leaf3, according to the records in the present disclosure, the PE1 needs to add a Leaf label in the process of encapsulating the data message in the BUM packet, that is, the PE1 carries the split horizon attribute of the corresponding link as the leaf attribute.

When receiving the BUM packet (the BUM packet is sent by the corresponding user site to the Root1) sent by the Root1, according to the records in the present disclosure, the PE1 needs to encapsulate the data message in the BUM packet, but has no need to add a Leaf or Root label, that is, the PE1 may indicate that the split horizon attribute of the corresponding link is the root attribute. It is to be noted that when the PE1 receives the BUM packet sent by the Root1, because the link also belongs to the ESI-1, the Root1 also has the ESI attribute except the root attribute. Therefore, the PE1 needs to add an ESI label in the encapsulation process to indicate that the Root1 belongs to the ESI-1.

When receiving the BUM packet (the BUM packet is sent by the corresponding user site to the Leaf1) sent by the Leaf1, according to the records in the present disclosure, the PE3 needs to add the Leaf label in the process of encapsulating the data message in the BUM packet, that is, the PE3 carries the split horizon attribute of the corresponding link as the leaf attribute. It is to be noted that when the PE3 receives the BUM packet sent by the Leaf1, because the link also belongs to the ESI-2, the Leaf1 also has the ESI attribute except the leaf attribute. It is stipulated in the present disclosure that because the Leaf label and the ESI label occupy the same position in the data packet, there is a mutually exclusive relationship between them; in this case, it is stipulated that the Leaf label should be encapsulated.

In addition, when receiving the data packet, the node at a receiving end may query context information in a VNI label entry to determine whether the Leaf label or the ESI label is encapsulated at the corresponding position in the data packet. In an embodiment, whether it is the Leaf label or the ESI label encapsulated in the data packet is recorded in the context information of the VNI label entry. For the ESI label, the ESI label is also recorded in the context information of the VNI label entry. In this way, the label type of the data packet, and the attribute and affiliation of the corresponding link may be obtained.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the related technology can be embodied in the form of software product; the computer software product is stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) perform all or part of the method in each embodiment of the present disclosure.

Embodiment Two

Figure 9:
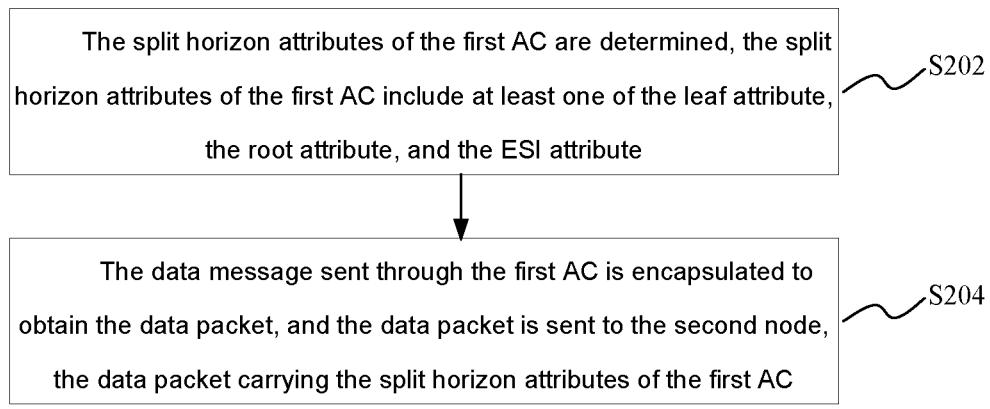
FIG. 9 is a flowchart of a message encapsulation method provided according to an embodiment of the present disclosure.

In the present embodiment, a message encapsulation method is provided. FIG. 9 is a flowchart of a message encapsulation method provided according to an embodiment of the present disclosure. The message encapsulation method is applied to the first node. As shown in FIG. 9, the method includes the following steps.

At S202, the split horizon attributes of the first AC are determined. The split horizon attributes of the first AC include at least one of the leaf attribute, the root attribute, or the ESI attribute.

At S204, the data message sent through the first AC is encapsulated to obtain the data packet, and the data packet is sent to the second node. The data packet carries the split horizon attributes of the first AC.

Through the method in the present embodiment, in the process of encapsulating the data message sent through the first AC, the data packet, which is obtained by encapsulating, carries the split horizon attributes of the first AC determined by the first node, and the split horizon attributes of the first AC include at least one of the leaf attribute, the root attribute, or the ESI attribute. Therefore, the method in the present embodiment may solve the problem in the related art that the NVO3 technology cannot realize the simulation of the E-Tree service, so as to realize the simulation of the E-Tree service in the NVO3 technology.

It is to be noted that the execution body of S202 and S204 is the first node.

In an optional embodiment, the formats of the data packet include one of the following: Geneve and VXLAN-GPE.

In an optional embodiment, in S204, when the format of the data packet is Geneve, the data packet includes the Geneve Header, which is used to carry the split horizon attributes of the first AC.

In an optional embodiment, the Geneve Header includes the variable length options, the Geneve option data types are extended in the variable length options, and the Geneve option data types are used to carry the split horizon attributes of the first AC.

In an optional embodiment, the Protocol Type field is extended in the Geneve Header, and the value of the Protocol Type field is the first E-Tree specified value. That the value of the Protocol Type field is the first E-Tree specified value is used to indicate that:

the inner load of the data packet includes the data message, and the split horizon attribute of the first AC is the leaf attribute.

In an optional embodiment, in S204, when the format of the data packet is VXLAN-GPE, the data packet includes the VXLAN-GPE Header, which is used to carry the split horizon attributes of the first AC.

In an optional embodiment, the NP field is extended in the VXLAN-GPE Header, and the value of the NP field is the second E-Tree specified value.

In an optional embodiment, when the split horizon attributes of the first AC include the ESI attribute and the root attribute, the Geneve option data type is also used to carry the ESI label information, which is used to identify the ESI to which the first AC belongs.

The ESI label information includes one of the following: the MPLS label and the VNI label.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the related technology can be embodied in the form of software product; the computer software product is stored in a storage medium (for example, an ROM/an RAM, a magnetic disk, and a compact disc) and includes a number of instructions to make a computer device (which can be a personal computer, a server or a network device, etc.) perform all or part of the method in each embodiment of the present disclosure.

Embodiment Three

In the present embodiment, a message decapsulation device is also provided. The device is configured to implement the above embodiments and optional implementation modes. The embodiments and preferred implementations which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 10:
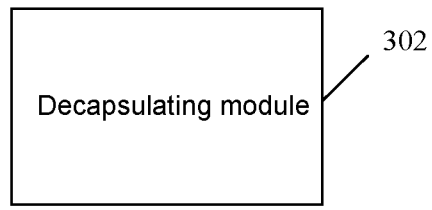
FIG. 10 is a structural block diagram of a message decapsulation device provided according to an embodiment of the present disclosure.

FIG. 10 is a structural block diagram of a message decapsulation device provided according to an embodiment of the present disclosure. As shown in FIG. 10, the device includes: a decapsulating module 302.

The decapsulating module 302 is configured to decapsulate the data packet sent by the first node.

The data packet is obtained by encapsulating, by the first node, the data message sent through the first AC. The data packet carries the split horizon attributes of the first AC determined by the first node. The split horizon attributes of the first AC include at least one of the leaf attribute, the root attribute, or the ESI attribute.

Through the device in the present embodiment, in the process of decapsulating the data packet sent by the first node, the data packet, which is obtained by encapsulating, by the first node, the data message sent through the first AC, carries the split horizon attributes of the first AC determined by the first node, and the split horizon attributes of the first AC include at least one of the leaf attribute, the root attribute, or the ESI attribute. Therefore, the device in the present embodiment may solve the problem in the related art that the NVO3 technology cannot realize the simulation of the E-Tree service, so as to realize the simulation of the E-Tree service in the NVO3 technology.

In an optional embodiment, the formats of the data packet include one of the following: Geneve and VXLAN-GPE.

In an optional embodiment, in the decapsulating module 302, when the format of the data packet is Geneve, the data packet includes the Geneve Header, which is used to carry the split horizon attributes of the first AC.

In an optional embodiment, the Geneve Header includes the variable length options, the Geneve option data types are extended in the variable length options, and the Geneve option data types are used to carry the split horizon attributes of the first AC.

In an optional embodiment, the Protocol Type field is extended in the Geneve Header, and the value of the Protocol Type field is the first E-Tree specified value. That the value of the Protocol Type field is the first E-Tree specified value is used to indicate that: the inner load of the data packet includes the data message, and the split horizon attribute of the first AC is the leaf attribute.

In an optional embodiment, in the decapsulating module 302, when the format of the data packet is VXLAN-GPE, the data packet includes the VXLAN-GPE Header, which is used to carry the split horizon attributes of the first AC.

In an optional embodiment, the NP field is extended in the VXLAN-GPE Header, and the value of the NP field is the second E-Tree specified value.

In an optional embodiment, when the split horizon attributes of the first AC include the ESI attribute and the root attribute, the Geneve option data type is also used to carry the ESI label information, which is used to identify the ESI to which the first AC belongs.

The ESI label information includes one of the following: the MPLS label and the VNI label.

In an optional embodiment, the decapsulating module 302 is further configured to obtain, after receiving the data packet sent by the first node, the decapsulated data message, and process the data message according to the following objects: the split horizon attributes of the first AC and the split horizon attributes of the second AC.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Embodiment Four

In the present embodiment, a message encapsulation device is also provided. The device is configured to implement the above embodiments and optional implementation modes. The embodiments and preferred implementations which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 11:
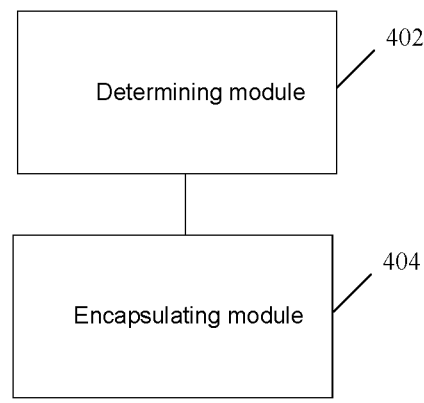
FIG. 11 is a structural block diagram of a message encapsulation device provided according to an embodiment of the present disclosure.

FIG. 11 is a structural block diagram of a message encapsulation device provided according to an embodiment of the present disclosure. As shown in FIG. 11, the device includes: a determining module 402 and an encapsulating module 404.

The determining module 402 is configured to determine the split horizon attributes of the first AC. The split horizon attributes of the first AC include at least one of the leaf attribute, the root attribute, or the ESI attribute.

The encapsulating module 404 is configured to encapsulate the data message sent through the first AC to obtain the data packet, and send the data packet to the second node. The data packet carries the split horizon attributes of the first AC.

Through the device in the embodiment, in the process of encapsulating the data message sent through the first AC, the data packet, which is obtained by encapsulating, carries the split horizon attributes of the first AC determined by the first node, and the split horizon attributes of the first AC include at least one of the leaf attribute, the root attribute, or the ESI attribute. Therefore, the device in the present embodiment may solve the problem in the related art that the NVO3 technology cannot realize the simulation of the E-Tree service, so as to realize the simulation of the E-Tree service in the NVO3 technology.

In an optional embodiment, the formats of the data packet include one of the following: Geneve and VXLAN-GPE.

In an optional embodiment, in the encapsulating module 404, when the format of the data packet is Geneve, the data packet includes the Geneve Header, which is used to carry the split horizon attributes of the first AC.

In an optional embodiment, the Geneve Header includes the variable length options, the Geneve option data types are extended in the variable length options, and the Geneve option data types are used to carry the split horizon attributes of the first AC.

In an optional embodiment, the Protocol Type field is extended in the Geneve Header, and the value of the Protocol Type field is the first E-Tree specified value. That the value of the Protocol Type field is the first E-Tree specified value is used to indicate that: the inner load of the data packet includes the data message, and the split horizon attribute of the first AC is the leaf attribute.

In an optional embodiment, in the encapsulating module 404, when the format of the data packet is VXLAN-GPE, the data packet includes the VXLAN-GPE Header, which is used to carry the split horizon attributes of the first AC.

In an optional embodiment, the NP field is extended in the VXLAN-GPE Header, and the value of the NP field is the second E-Tree specified value.

In an optional embodiment, when the split horizon attributes of the first AC include the ESI attribute and the root attribute, the Geneve option data type is also used to carry the ESI label information, which is used to identify the ESI to which the first AC belongs.

The ESI label information includes one of the following: the MPLS label and the VNI label.

It is to be noted that, the above multiple modules may be realized by software or hardware. For the latter, the each of the above modules may be realized by, but not limited to, the following way: all of the above modules are in the same processor; or, the above multiple modules are respectively in different processors in form of any combination.

Embodiment Five

An embodiment of the present disclosure also provides a storage medium. The storage medium stores a computer program. The computer program is configured to execute, when running, the steps in any of the above method embodiments.

In the present embodiment, the storage medium may be set to store the computer program for executing the following step.

At S1, the data packet sent by the first node is decapsulated. The data packet is obtained by encapsulating, by the first node, the data message sent through the first AC. The data packet carries the split horizon attributes of the first AC determined by the first node. The split horizon attributes of the first AC include at least one of the leaf attribute, the root attribute, or the ESI attribute.

The specific examples in the present embodiment may refer to the examples described in the above embodiments and alternative embodiments, and will not be repeated here.

In the present embodiment, the storage media may include, but not limited to, a USB flash disk, an ROM, an RAM, a mobile hard disk, a magnetic disk, a compact disc, and other media capable of storing the computer program.

Embodiment Six

An embodiment of the present disclosure also provides a storage medium. The storage medium stores a computer program. The computer program is configured to execute, when running, the steps in any of the above method embodiments.

In the present embodiment, the storage medium may be set to store the computer program for executing the following steps.

At S1, the split horizon attributes of the first AC are determined. The split horizon attributes of the first AC include at least one of the leaf attribute, the root attribute, or the ESI attribute.

At S2, the data message sent through the first AC is encapsulated to obtain the data packet, and the data packet is sent to the second node. The data packet carries the split horizon attributes of the first AC.

In the present embodiment, the storage media may include, but not limited to, a USB flash disk, an ROM, an RAM, a mobile hard disk, a magnetic disk, a compact disc, and other media capable of storing the computer program.

Embodiment Seven

An embodiment of the present disclosure also provides an electronic device, which includes a memory and a processor. The memory stores a computer program. The processor is configured to run the computer program, so as to execute the steps in any of the above method embodiments.

In the present embodiment, the electronic device may also include a transmission device and an input/output device. The transmission device is connected with the processor, and the input/output device is connected with the processor.

In the present embodiment, the processor may be configured to execute the following step through the computer program.

At S1, the data packet sent by the first node is decapsulated. The data packet is obtained by encapsulating, by the first node, the data message sent through the first AC.

The data packet carries the split horizon attributes of the first AC determined by the first node. The split horizon attributes of the first AC include at least one of the leaf attribute, the root attribute, or the ESI attribute.

The specific examples in the present embodiment may refer to the examples described in the above embodiments and alternative embodiments, and will not be repeated here.

Embodiment Eight

An embodiment of the present disclosure also provides an electronic device, which includes a memory and a processor. The memory stores a computer program. The processor is configured to run the computer program, so as to execute the steps in any of the above method embodiments.

In the present embodiment, the electronic device may also include a transmission device and an input/output device. The transmission device is connected with the processor, and the input/output device is connected with the processor.

In the present embodiment, the processor may be configured to execute the following steps through the computer program.

At S1, the split horizon attributes of the first AC are determined. The split horizon attributes of the first AC include at least one of the leaf attribute, the root attribute, or the ESI attribute.

At S2, the data message sent through the first AC is encapsulated to obtain the data packet, and the data packet is sent to the second node. The data packet carries the split horizon attributes of the first AC.

The specific examples in the present embodiment may refer to the examples described in the above embodiments and alternative embodiments, and will not be repeated here.

It is apparent that those skilled in the art should appreciate that the above multiple modules and multiple steps of the present disclosure may be implemented by a general-purpose computing device, and they may be centralized in a single computing device or distributed on a network composed of multiple computing devices; in an embodiment, they may be implemented by a program code which is capable of being executed by the computing device, so that they may be stored in a storage device and executed by the computing device; and in some situations, the presented or described steps may be executed in an order different from that described here; or they are made into multiple integrated circuit modules, respectively; or multiple modules and steps of them are made into a single integrated circuit module to realize. Therefore, the present disclosure is not limited to any particular combination of hardware and software.

What is claimed is:

1. A message decapsulation method, applied to a second node, comprising:
    decapsulating a data packet sent by a first node;
    wherein, the data packet is obtained by encapsulating, by the first node, a data message sent through a first Attachment Circuit (AC), the data packet carries a split horizon attribute of the first AC determined by the first node, and the split horizon attribute of the first AC comprises at least one of the following: a leaf attribute, a root attribute; the leaf attribute or the root attribute indicates a node attribute of a user-side interface corresponding to the first AC in an E-Tree service;
    wherein a format of the data packet comprise one of the following: Generic Network Virtualization Encapsulation (Geneve), and Virtual Extensible Local Area Network Generic Protocol Extension (VXLAN-GPE).

2. The method according to claim 1, wherein when the format of the data packet is the Geneve, the data packet comprises a Geneve Header, which is used to carry the split horizon attribute of the first AC.

3. The method according to claim 2, wherein the Geneve Header comprises variable length options, a Geneve option data type is extended in the variable length options, and the Geneve option data types is used to carry the split horizon attribute of the first AC.

4. The method according to claim 2, wherein a Protocol Type field is extended in the Geneve Header, and a value of the Protocol Type field is a specified value of a first Ethernet Tree (E-Tree); the value of the Protocol Type field, which is the specified value of the first E-Tree, is used to indicate that: an inner load of the data packet comprises a data message, and the split horizon attribute of the first AC is the leaf attribute.

5. The method according to claim 1, wherein when the format of the data packet is the VXLAN-GPE, the data packet comprises a VXLAN-GPE Header, which is used to carry the split horizon attribute of the first AC.

6. The method according to claim 5, wherein a Next Protocol (NP) field is extended in the VXLAN-GPE Header, and a value of the NP field is a specified value of a second E-Tree.

7. The method according to claim 3, wherein when the split horizon attribute of the first AC comprises the ESI attribute and the root attribute, the Geneve option data type is also used to carry ESI label information, which is used to identify the ESI to which the first AC belongs;
the ESI label information comprises one of the following: a Multi-Protocol Label Switching (MPLS) label and a Virtual Network Identifier (VNI) label.

8. The method according to claim 1, wherein after decapsulating the data packet sent by the first node, the method further comprises:
obtaining the decapsulated data message, and processing the decapsulated data message according to the following objects: the split horizon attribute of the first AC and the split horizon attribute of the second AC.

9. A message encapsulation method, applied to a first node, comprising:
determining a split horizon attribute of a first Attachment Circuit (AC), wherein the split horizon attribute of the first AC comprises at least one of the following: a leaf attribute, a root attribute; the leaf attribute or the root attribute indicates a node attribute of a user-side interface corresponding to the first AC in an E-Tree service; and
encapsulating a data message sent through the first AC to obtain a data packet, and sending the data packet to a second node, wherein the data packet carries the split horizon attribute of the first AC;
wherein a format of the data packet comprise one of the following: Generic Network Virtualization Encapsulation (Geneve), and Virtual Extensible Local Area Network Generic Protocol Extension (VXLAN-GPE).

10. The method according to claim 9, wherein when the format of the data packet is the Geneve, the data packet comprises a Geneve Header, which is used to carry the split horizon attribute of the first AC.

11. The method according to claim 10, wherein the Geneve Header comprises variable length options, a Geneve option data type is extended in the variable length options, and the Geneve option data type is used to carry the split horizon attribute of the first AC.

12. The method according to claim 10, wherein a Protocol Type field is extended in the Geneve Header, and the value of the Protocol Type field is a specified value of a first Ethernet Tree (E-Tree); the value of the Protocol Type field, which is the specified value of the first E-Tree, is used to indicate that: an inner load of the data packet comprises a data message, and the split horizon attribute of the first AC is the leaf attribute.

13. The method according to claim 9, wherein when the format of the data packet is the VXLAN-GPE, the data packet comprises a VXLAN-GPE Header, which is used to carry the split horizon attribute of the first AC.

14. The method according to claim 13, wherein a Next Protocol (NP) field is extended in the VXLAN-GPE Header, and the value of the NP field is a specified value of a second E-Tree.

15. The method according to claim 11, wherein when the split horizon attribute of the first AC comprises the ESI attribute and the root attribute, the Geneve option data type is also used to carry ESI label information, which is used to identify the ESI to which the first AC belongs;
the ESI label information comprises one of the following: a Multi-Protocol Label Switching (MPLS) label and a Virtual Network Identifier (VNI) label.

16. A message decapsulation device, applied to a second node, comprising:
a decapsulating module, configured to decapsulate a data packet sent by a first node;
wherein, the data packet is obtained by encapsulating, by the first node, a data message sent through a first Attachment Circuit (AC), the data packet carries split horizon attribute of the first AC determined by the first node, and the split horizon attribute of the first AC comprise at least one of the following: a leaf attribute, a root attribute, and the leaf attribute or the root attribute indicates a node attribute of a user-side interface corresponding to the first AC in an E-Tree service;
wherein a format of the data packet comprise one of the following: Generic Network Virtualization Encapsulation (Geneve), and Virtual Extensible Local Area Network Generic Protocol Extension (VXLAN-GPE).

17. A non-transitory storage medium, storing a computer program, wherein the computer program is configured to perform, when executed by a processor, the method as claimed in claim 1.

18. An electronic device, comprising a memory and a processor, wherein the memory stores a computer program, and the processor is configured to run the computer program to perform the method as claimed in claim 9.

19. The method according to claim 1, wherein the split horizon attribute of the first AC further comprises an Ethernet Segment Identifier (ESI) attribute.

* * * * *